(12) United States Patent
Bristow

(10) Patent No.: US 12,502,373 B2
(45) Date of Patent: Dec. 23, 2025

(54) HIGH-CONTENT ABAMECTIN EMULSIFIABLE CONCENTRATE

(71) Applicant: Rotam Agrochem International Company Limited, Chai Wan (HK)

(72) Inventor: James Timothy Bristow, Chai Wan (HK)

(73) Assignee: ALBAUGH, LLC, Ankeny, IA (US)

( * ) Notice: Subject to any disclaimer, the term of this patent is extended or adjusted under 35 U.S.C. 154(b) by 144 days.

(21) Appl. No.: 17/517,765

(22) Filed: Nov. 3, 2021

(65) Prior Publication Data

US 2023/0139501 A1 May 4, 2023

(51) Int. Cl.
*A61K 31/351* (2006.01)
*A61K 9/107* (2006.01)
*A61K 47/18* (2017.01)

(52) U.S. Cl.
CPC ............ *A61K 31/351* (2013.01); *A61K 9/107* (2013.01); *A61K 47/18* (2013.01)

(58) Field of Classification Search
CPC ....... A61K 31/351; A61K 9/107; A61K 47/18
See application file for complete search history.

(56) References Cited

U.S. PATENT DOCUMENTS

| | | | | |
|---|---|---|---|---|
| 5,206,225 A | * | 4/1993 | Horstmann | A01N 43/653 548/110 |
| 5,227,402 A | * | 7/1993 | Rochling | A01N 25/04 514/532 |
| 2007/0293550 A1 | * | 12/2007 | Rochling | A01N 47/36 514/384 |

FOREIGN PATENT DOCUMENTS

| | | | | |
|---|---|---|---|---|
| WO | WO-03075657 A1 | * | 9/2003 | ............ A01N 25/22 |
| WO | WO-2007028538 A3 | * | 5/2007 | ............ A01N 25/30 |
| WO | WO-2007092580 A2 | * | 8/2007 | ............ A01N 43/80 |
| WO | WO-2014154447 A1 | * | 10/2014 | ............ A01N 43/56 |

OTHER PUBLICATIONS

English Translation of CN 108935494 A (English Translation CN 494 A) published Dec. 7, 2018 (Year: 2018).*
English Translation of CN 101984808 A, published Mar. 16, 2011. (Year: 2011).*

* cited by examiner

*Primary Examiner* — Jeffrey S Lundgren
*Assistant Examiner* — Ibrahim D Bori
(74) *Attorney, Agent, or Firm* — Dickinson Wright PLLC

(57) ABSTRACT

An emulsifiable concentrate comprising a high content of abamectin is provided. The concentrate includes an amide solvent of formula (I) and an alkyl lactate of formula (II):

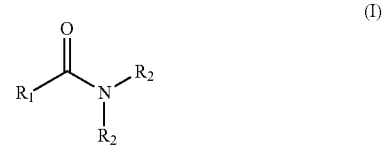

(I)

wherein $R_1$ is $C_5$-$C_{19}$ alkyl and $R_2$ is methyl, ethyl, propyl, butyl or a mixture thereof;

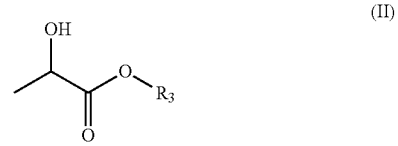

(II)

wherein $R_3$ is $C_1$-$C_{16}$ alkyl. The concentrate optionally includes a surfactant. The concentrate exhibits very good low temperature stability and dilution stability. A method for preparing the concentrate; and an emulsion that can be obtained by mixing water, abamectin, the amide of formula (I) and the alkyl lactate of formula (II), is also provided.

15 Claims, No Drawings

HIGH-CONTENT ABAMECTIN EMULSIFIABLE CONCENTRATE

TECHNICAL FIELD

The present invention relates to a high-content abamectin emulsifiable concentrate preparation. More specifically, the present invention relates to the use of an amide of formula (I) and/or an alkyl lactate solvent system of formula (II) for preparation of a high-content abamectin emulsifiable concentrate preparation. The high-content abamectin emulsifiable concentrate preparation remains a stable and excellent emulsifiable concentrate preparation under low temperature conditions and at a low pesticide concentration upon dilution with water.

BACKGROUND ART

Agrochemicals such as herbicides, pesticides or microbicides are usually combined with carriers and adjuvants to make a formulated product before being sold to terminal farmers. On the one hand, the adjuvants and carriers used increase the cost and make the product unsuitable for the environment. On the other hand, these ingredients often make a positive contribution to the effect of the preparation. Organic solvents commonly used in formulated agricultural products, in particular hydrocarbon solvents, are examples of carriers with the above-mentioned characteristics. Due to environmental pressures and policy restrictions, formulators are now seeking to prepare formulated agricultural products that contain little or no petroleum hydrocarbon solvents or chlorinated hydrocarbon solvents and achieve the same effect as those formulated previously.

Abamectin is a high-efficiency and broad-spectrum antibiotic pesticidal and acaricidal agent. Abamectin is composed of a group of macrolide compounds with an active substance of AVERMECTIN, and has stomach toxicity and contact killing effects on mites and insects. Abamectin can quickly decompose and dissipate when sprayed on the leaf surface, and the active ingredients that penetrate into the plant parenchyma tissue can exist in the tissue for a long time and have a conductive effect, thereby having a long residual effectiveness on pest mites and insects that feed on the plant tissues. Abamectin is mainly directed at endo- and ecto-parasites of poultry and livestock and crop pests, such as parasitic red insects, Diptera, Coleoptera, Lepidoptera and pest mites. Abamectin technical powder is a white or yellow crystal with a density of 1.16, a vapor pressure of <200 nPa, a melting point of 150° C.-155° C., and a solubility at 21° C. of 7.8 μg/L in water. Abamectin is stable under common storage conditions, and the aqueous solution thereof will not be hydrolysed at pH: 5-9 and 25° C. With regard to the toxicity of abamectin, rats have an oral LD50 of 1470 mg/kg. Abamectin has no teratogenic, carcinogenic and mutagenic effects.

Most of the existing commercially available abamectin products are low-content abamectin emulsifiable concentrates, such as an emulsifiable concentrate containing 1.8% or 18 g/L of abamectin. In view of the influence of various economic and environmental factors, there is a need for a high-content abamectin emulsifiable concentrate. For example, it is desirable to provide high-content abamectin emulsifiable concentrate preparations to reduce packaging and transportation costs and the usage amount of organic solvents, thereby increasing the profit and value of products for manufacturing enterprises or operators, and to reduce the amount of packaging materials that must be processed after pesticide application and the amount of the solvents released to the environment.

However, the first problem faced by the high-content abamectin emulsifiable concentrate is the problem of low temperature stability. Most high-content abamectin emulsifiable concentrates (such as 5%, 10% or 20%) are easy to crystallize out or crystallize under low temperature conditions due to a relatively high content of abamectin, resulting in unqualified product quality. Even if the problem of low temperature stability faced by the high-content abamectin emulsifiable concentrate is solved, another more severe test is still faced thereby, that is, the problem of crystallization of the high-content abamectin emulsifiable concentrate diluted with water to the application concentration, which is because the high-content abamectin emulsifiable concentrate needs to be diluted by a higher factor to reach the application concentration. With regard to for example, 1.8% low-content abamectin emulsifiable concentrate, several times or more than ten times the amount of water used to dilute 1.8% abamectin emulsifiable concentrate is needed to dilute the high-content abamectin emulsifiable concentrate. Generally, the high-content abamectin emulsifiable concentrate may need to be diluted 10,000-40,000 times with water before application. Such a high dilution factor can easily lead to the crystallization of abamectin in the diluent, thus blocking the spray head and spray equipment.

The objective of the present invention is to provide a high-content abamectin emulsifiable concentrate which overcomes the above-mentioned disadvantages.

SUMMARY

It is unexpectedly found that a stable emulsifiable concentrate including a high content of abamectin can be prepared using a combination of an amide of formula (I) and/or an alkyl lactate of formula (II), $$\underset{R_1}{\overset{O}{\|}}\underset{\underset{R_2}{|}}{N}\diagdown R_2 \quad (I)$$

wherein $R_1$ is $C_5$-$C_{19}$ alkyl and $R_2$ is methyl, ethyl, propyl, butyl or a mixture thereof;

$$\underset{OH}{\overset{}{\diagup}}\underset{\underset{O}{\|}}{\diagdown}O\diagdown R_3 \quad (II)$$

and wherein $R_3$ is $C_1$-$C_{16}$ alkyl.

Therefore, the present invention provides an emulsifiable concentrate which can include a high content of abamectin, which is a mixture comprising the following ingredients:
(1) abamectin;
(2) an amide of formula (I) and/or an alkyl lactate of formula (II); and
(3) an optional surfactant;

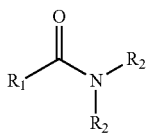

wherein $R_1$ is $C_5$-$C_{19}$ alkyl and $R_2$ is methyl, ethyl, propyl, butyl or a mixture thereof;

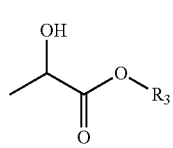

and wherein $R_3$ is $C_1$-$C_{16}$ alkyl.

DETAILED DESCRIPTION

Generally, the present invention relates to a high-content abamectin emulsifiable concentrate, in particular an emulsifiable concentrate containing 3%-30% by weight of abamectin, especially an abamectin emulsifiable concentrate containing 5%-20% by weight of abamectin. The emulsifiable concentrate is sufficient to provide a stable abamectin preparation that does not crystallize in a low temperature environment and still does not crystallize out at a high dilution ratio with water (for example, at least 10,000 times of dilution ratio).

Emulsifiable concentrate generally refers to a concentrate of an oil-in-water emulsion formed when mixed with water (for example, the weight ratio is 1 part of concentrate to 99 parts or 999 parts or 9999 parts of water). The emulsion usually forms spontaneously. The resulting emulsion may have an average droplet size of greater than 0.1 um, preferably greater than 0.5 um, especially greater than 0.8 um, and most preferably greater than 1.0 um. The average droplet size can be determined by a laser diffractometer, for example, Malvern Mastersizer 3000.

Preferably, the amides of formula (I) are those in which $R_1$ is $C_7$-$C_{13}$ alkyl (preferably linear) and $R_2$ is methyl. Especially preferably, the amides of formula (I) are those in which $R_1$ is $C_7$-$C_{11}$ alkyl and $R_2$ is methyl. In particular, $R_1$ is n-nonyl and $R^2$ is methyl.

A mixture of the amides of formula (I) is also possible, for example the mixture in which $R_1$ is $C_7$-$C_{13}$ alkyl (preferably linear) and $R^2$ is methyl. In most cases, the mixture of the amides of formula (I) contains two amides of formula (I), and in each case, the amount is based on at least 20%, preferably at least 30% of the total amount of the amides of formula (I).

The concentrate may comprise up to 75% by weight, preferably not more than 70% by weight, and especially not more than 60% by weight of the amide of formula (I). The concentrate may comprise at least 10% by weight, preferably at least 15% by weight, and especially at least 20% by weight of the amide of formula (I).

It may be suitable that the concentrate comprises 10%-65% by weight, especially 15%-70% by weight, and more particularly 20%-60% by weight of the amide of formula (I).

Preferably, the alkyl lactates of formula (II) are those in which $R_3$ is $C_1$-$C_8$ alkyl (preferably linear). Especially preferably, the alkyl lactates of formula (II) are those in which $R_3$ is $C_2$-$C_6$ alkyl (preferably linear). In particular, $R_3$ is n-butyl.

A mixture of the alkyl lactates of formula (II) is also possible, for example the mixture in which $R_3$ is $C_1$-$C_8$ alkyl (preferably linear). In most cases, the mixture of the alkyl lactates of formula (II) comprises two alkyl lactates of formula (II), and in each case, the amount is based on at least 20%, preferably at least 30% of the total amount of the alkyl lactates of formula (II).

The concentrate may comprise up to 60% by weight, preferably up to 50% by weight, and especially up to 40% by weight of the alkyl lactate of formula (II). The concentrate may comprise at least 1% by weight, preferably at least 5% by weight, and especially at least 10% by weight of the alkyl lactate of formula (II).

It may be suitable that the concentrate comprises 1%-60% by weight, especially 5%-55% by weight, and more particularly 10%-50% by weight of the alkyl lactate of formula (II).

In addition, the optional surfactant of the concentrate comprises auxiliary agents commonly used in crop protection products, such as emulsifiers, dispersants, wetting agents, adjuvants, cosolvents, penetrants, protective colloids, adhesives, thickening agents, microbicides, antifreezing agents, antifoaming agents, colorants, and tackifiers. Suitable surfactants are surface-active compounds, such as anionic, cationic, nonionic and amphoteric surfactants, block polymers, polyelectrolytes, and mixtures thereof. Such surfactants can be used as emulsifiers, dispersants, cosolvents, wetting agents, penetrants, protective colloids or adjuvants. Examples of surfactants are listed in McCutcheon's, vol. 1: Emulsifiers & Detergents, McCutcheon's Directories, Glen Rock, USA, 2008 (International or North American version).

Suitable anionic surfactants are alkali metals, alkaline earth metals or ammonium salts of sulfonic acid, sulfuric acid, phosphoric acid, and carboxylic acid, and mixtures thereof. Examples of sulfonates are alkyl aryl sulphonates, diphenyl sulfonates, α-olefin sulfonates, lignin sulfonates, sulfonates of fatty acids and oils, sulfonates of ethoxylated alkylphenols, sulfonates of alkoxylated arylphenols, sulfonates of condensed napthalenes, sulfonates of dodecyl- and tridecylbenzenes, sulfonates of naphthalenes and alkylnaphthalenes, sulfosuccinates or sulphosuccinamates. Examples of sulfates are sulfates of fatty acids and oils, sulfates of ethoxylated alkylphenols, sulfates of alcohols, sulfates of ethoxylated alcohols or sulfates of fatty acid esters. Examples of phosphates are phosphate esters. Examples of carboxylates are alkyl carboxylates and carboxylated alcohol or alkylphenol ethoxylates. Preferred anionic surfactants are sulfates and sulfonates.

Suitable nonionic surfactants are alkoxylates, N-substituted fatty acid amides, amine oxides, esters, glycosyl surfactants, polymeric surfactants and mixtures thereof. Examples of alkoxylates are compounds such as alcohols, alkylphenols, amines, amides, arylphenols, fatty acids or fatty acid esters alkoxylated with 1-50 equivalents. Ethylene oxide and/or propylene oxide can be used for alkoxylation, preferably ethylene oxide. Examples of N-substituted fatty acid amides are fatty acid glucamides or fatty acid alkanolamides. Examples of esters are fatty acid esters, glycerides or monoglycerides. Examples of glycosyl surfactants are sorbitan, ethoxylated sorbitan, sucrose and glucose esters, or alkyl polyglucosides. Examples of polymeric surfactants are homopolymers or copolymers of vinylpyrrolidone, vinyl alcohol or vinyl acetate. Preferred nonionic surfactants are alkoxylates. Nonionic surfactants such as alkoxylates can also be used as adjuvants.

Suitable cationic surfactants are quaternary-type surfactants, such as quaternary ammonium compounds having 1 or 2 hydrophobic groups, or salts of long-chain primary amines.

Suitable amphoteric surfactants are alkyl betaines and imidazolines.

Suitable block polymers are A-B or A-B-A type block polymers comprising blocks of polyoxyethylene and polyoxypropylene, or A-B-C type block polymers comprising alkanol, polyoxyethylene and polyoxypropylene.

Suitable polyelectrolytes are polyacids or polybases, preferably polyacids. Examples of polybases are polyvinylamines or polyethylene amines. Examples of polyacids are acrylic copolymers or AMPS (2-acrylamido-2-methylpropanesulfonic acid) copolymers. Preferably, the polyelectrolytes are copolymers comprising, in the polymerized form, amides containing at least one monomer selected from N-vinyllactam, N—$C_1$-$C_6$ alkyl acrylamide and N,N-di $C_1$-$C_6$ alkyl acrylamide; poly($C_{2-6}$ alkylene glycol) (meth)acrylate and/or mono $C_{1-22}$ alkyl-terminated poly($C_{2-6}$ alkylene glycol) (meth)acrylate; $C_1$-$C_8$ alkyl (meth)acrylate; and (meth)acrylic acid. More preferably, the polyelectrolytes are copolymers comprising, in the polymerized form, amides containing at least one monomer selected from N-vinyllactam, mono $C_{1-22}$ alkyl-terminated poly($C_{2-6}$ alkylene glycol) (meth)acrylate; $C_1$-$C_8$ alkyl (meth)acrylate; and (meth)acrylic acid. In another preferred form, the polyelectrolytes are copolymers comprising, in the polymerized form, 25-85 wt % of amides containing at least one monomer selected from N-vinyllactam, 1-40 wt % of mono $C_{1-22}$ alkyl-terminated poly($C_{2-6}$ alkylene glycol) (meth)acrylate; 5-50 wt % of $C_1$-$C_8$ alkyl (meth)acrylate; and up to 15 wt % of (meth)acrylic acid, wherein the sum of the monomers equals to 100%. In another preferred form, the polyelectrolytes are copolymers comprising, in the polymerized form, 30-85 wt % of amides containing at least one monomer selected from N-vinyllactam, 5-20 wt % of mono $C_{1-22}$ alkyl-terminated poly($C_{2-6}$ alkylene glycol) (meth)acrylate; 8-35 wt % of $C_1$-$C_8$ alkyl (meth)acrylate; and 0.5-10 wt % of (meth)acrylic acid, wherein the sum of the monomers equals to 100%. In another preferred form, the polyelectrolytes are copolymers comprising in the polymerized form at least one ethylenically unsaturated monomer containing a sulfonic acid group, at least one monomer selected from $C_1$-$C_4$ alkyl (meth)acrylate and at least one monomer selected from $C_6$-$C_{22}$ alkyl (meth)acrylate. In another preferred form, the polyelectrolytes are copolymers comprising in the polymerized form 5%-50% by weight of at least one ethylenically unsaturated monomer containing a sulfonic acid group, 20%-70% by weight of at least one monomer selected from $C_1$-$C_4$ alkyl (meth)acrylate and 5%-30% by weight of at least one monomer selected from $C_6$-$C_{22}$ alkyl (meth)acrylate, based on the total weight of the monomer.

Suitable adjuvants are compounds that have negligible pesticide activity or even have no pesticide activity and improve the biological performance of the pesticide on a target object. Examples are surfactants, mineral oils or vegetable oils and other auxiliary agents. Other examples are listed by Knowles, Adjuvants and additives, Agrow Reports DS256, T&F Informa UK, 2006, Chapter 5.

Suitable microbicides are bronopol and isothiazolinone derivatives such as alkylisothiazolinones and benzoisothiazolinones. Suitable antifreezing agents are ethylene glycol, propylene glycol, urea and glycerol.

Suitable antifoaming agents are polysiloxanes, long-chain alcohols and fatty acid salts.

Suitable colorants (for example red, blue or green) are low water-soluble pigments and water-soluble dyes. Examples are inorganic colorants (such as iron oxide, titanium oxide, and iron hexacyanoferrate) and organic colorants (such as alizarin colorants, azo colorants, and phthalocyanine colorants).

It may be suitable that the concentrate comprises 1%-30% by weight, especially 2%-25% by weight, and more particularly 5%-20% by weight of surfactants.

In addition to the above-mentioned concentrate, additional insecticidal compounds that do not have an antagonistic effect on the abamectin active substance used in the present invention can also be added in the present invention, with examples as follows:

organic (thio)phosphates: azinphos-methyl, chlorpyrifos, chlorpyrifos-methyl, chlorfenvinphos, diazinon, dicrotophos, dimethoate, fenitrothion, methidathion, methyl-parathion, mevinphos, phenthoate, phosalone, phosmet, phoxim, pirimiphos-methyl, profenofos, prothiofos, sulprophos, tetrachlorvinphos, terbufos, and triazophos;

carbamates: alanycarb, aldicarb, bendiocarb, benfuracarb, carbaryl, carbofuran, carbosulfan, fenoxycarb, furathiocarb, methiocarb, methomyl, oxamyl, pirimicarb, propoxur, thiodicarb, and triazamate;

synthetic pyrethrins: bifenthrin, cyfluthrin, cyhalothrin, cyphenothrin, cypermethrin, deltamethrin, esfenvalerate, etofenprox, fenpropathrin, fenvalerate, imiprothrin, lambda-cyhalothrin, permethrin, prallethrin, resmethrin, silafluofen, tau-fluvalinate, tefluthrin, tetramethrin, tralomethrin, transfluthrin, profluthrin, and dimefluthrin;

insect growth regulators: a) chitin synthetic inhibitors: benzoyl ureas: chlorfluazuron, cyramazin, diflubenzuron, flucycloxuron, flufenoxuron, hexaflumuron, lufenuron, novaluron, teflubenzuron, and triflumuron; and buprofezin, diofenolan, hexythiazox, etoxazole, and clofentazine; b) ecdysone antagonists: halofenozide, methoxyfenozide, tebufenozide, and azadirachtin; c) juvenile hormone analogues: pyriproxyfen, methoprene, and fenoxycarb; and d) lipoid biosynthesis inhibitors: spirodiclofen, spiromesifen, and spirotetramat;

nicotinic receptor agonist/antagonist compounds: clothianidin, dinotefuran, flupyradifurone, imidacloprid, thiamethoxam, nitenpyram, acetamiprid, and thiacloprid;

macrolide insecticides: emamectin, milbemectin, lepimectin, spinosad, and spinetoram;

mitochondrial electron transport chain inhibitor (METI) I acaricidal agents: fenazaquin, pyridaben, tebufenpyrad, tolfenpyrad, and flufenerim;

ryanodine receptor inhibitors: chloranthraniliprole, cyantraniliprole, and flubendiamide;

and other insecticides: bifenazate, cartap, flonicamid, pyridalyl, pymetrozine, sulfur, thiocyclam, cyenopyrafen, flupyrazofos, cyflumetofen, amidoflumet, and bistrifluron.

In addition, the present invention relates to a method for preparing the high-content abamectin emulsifiable concentrate of the present invention by means of mixing abamectin, an amide of formula (I) and an alkyl lactate of formula (II) and an optional surfactant.

Furthermore, the present invention relates to an abamectin-containing emulsion that can be obtained by means of mixing water with the high-content abamectin emulsifiable concentrate of the present invention. The emulsion usually forms spontaneously during mixing. In most cases, the emulsion is an oil-in-water emulsion. The mixing ratio of water to high-content abamectin emulsifiable concentrate may be 50000:1 to 1:1, preferably 40000:1 to 5:1.

The present invention has the following advantages: the high-content abamectin emulsifiable concentrate is highly stable to low temperatures, characterized in that abamectin in the high-content abamectin emulsifiable concentrate does not crystallize or precipitate at low temperatures (for example, even below −5° C.); when the high-content abamectin emulsifiable concentrate is diluted with water, especially at a high dilution factor (for example, even higher than 10000 times), an emulsion is formed spontaneously, which is stable for a long time, and does not produce a crystallization substance to block the spray head and spray equipment; moreover, the preparation of the high-content abamectin emulsifiable concentrate also saves the company's packaging and transportation costs, and reduces the amount of packaging materials processed after application and the amount of the organic solvents discharged into the environment.

EXAMPLES

In order to aid the understanding of the present invention, the following examples are set forth for the present invention. A person skilled in the art should be clear that said examples are provided only for aiding the understanding of the present invention but should not be regarded as particular limitations to the present invention.

Amides of formula (I): N,N-dimethyl capramide, N,N-dimethyl octanamide, and N,N-dimethyl dodecylamide.

Alkyl lactates of formula (II): methyl lactate, ethyl lactate, and butyl lactate.

Example 1

| Abamectin 5% EC | |
|---|---|
| Abamectin | 5% |
| N,N-dimethyl capramide | 60% |
| Methyl lactate | 20% |
| Ethoxylated castor oil | 8% |
| Calcium dodecyl benzenesulfonate | 7% |

Example 2

| Abamectin 6% EC | |
|---|---|
| Abamectin | 6% |
| N,N-dimethyl octanamide | 50% |
| Ethyl lactate | 30% |
| Fatty alcohol ethoxylate | 6% |
| Vegetable oil ethoxylate | 8% |

Example 3

| Abamectin 10% EC | |
|---|---|
| Abamectin | 10% |
| N,N-dimethyl dodecylamide | 40% |
| Butyl lactate | 30% |
| Sodium dodecyl benzenesulfonate | 5% |
| Ethoxylated castor oil | 15% |

Example 4

| Abamectin 20% EC | |
|---|---|
| Abamectin | 20% |
| N,N-dimethyl capramide | 20% |
| Butyl lactate | 40% |
| Vegetable oil ethoxylate | 10% |
| Ethoxylated sorbitan | 10% |

Example 5

| Abamectin 15% EC | |
|---|---|
| Abamectin | 15% |
| N,N-dimethyl octanamide | 25% |
| Ethyl lactate | 35% |
| Silicone oil | 1% |
| Sorbitan | 8% |
| Calcium dodecyl benzenesulfonate | 7% |
| Methyl oleate | 9% |

Example 6

| Abamectin 8% EC | |
|---|---|
| Abamectin | 8% |
| N,N-dimethyl capramide | 40% |
| Butyl lactate | 10% |
| Silicone oil | 1% |
| Alkyl glycoside | 10% |
| Lignosulfonate | 5% |
| Cyclohexanone | 26% |

Example 7

| Abamectin 12% EC | |
|---|---|
| Abamectin | 12% |
| N,N-dimethyl capramide | 30% |
| Butyl lactate | 30% |
| Polysiloxane | 1% |
| Ethoxylated castor oil | 6% |
| Calcium dodecyl benzenesulfonate | 8% |
| Aromatic hydrocarbon 200ND | 13% |

Example 8

| Abamectin 20% EC | |
|---|---|
| Abamectin | 20% |
| N,N-dimethyl capramide | 40% |
| Vegetable oil ethoxylate | 10% |
| Ethoxylated sorbitan | 10% |
| Silicone oil | 1% |
| Methyl oleate | 19% |

Example 9

| Abamectin 18% EC | |
|---|---|
| Abamectin | 18% |
| Butyl lactate | 40% |
| Vegetable oil ethoxylate | 15% |
| Ethoxylated sorbitan | 5% |
| Silicone oil | 1% |
| N-methyl pyrrolidone | 19% |

Example 10

| Abamectin 12% EC | |
|---|---|
| Abamectin | 12% |
| Methyl lactate | 25% |
| Fatty alcohol ethoxylate | 15% |
| Calcium dodecyl benzenesulfonate | 5% |
| Silicone oil | 1% |
| N-methyl pyrrolidone | 42% |

The samples of the above-mentioned Examples 1-10 were placed in an environment of minus 5° C. for low temperature stability experiments, and each sample was observed after being respectively stored for 14 days. Samples that did not show any crystals were marked as "Not crystallize". Samples showing any crystals were marked as "Crystallize".

The samples of the above-mentioned Examples 1-10 were subjected to dilution stability experiments, which were respectively diluted with water by 3000 times and 20000 times, and placed in a 25° C. constant temperature water bath, and each diluent was observed after 2 hours. Samples that did not show any crystals were marked as "Not crystallize out". Samples showing any crystals were marked as "Crystallize out".

The results are shown in Table 1.

TABLE 1

| Example | Low temperature stability | Diluted by 3000 times | Diluted by 20000 times |
|---|---|---|---|
| Example 1 | Not crystallize | Not crystallize out | Not crystallize out |
| Example 2 | Not crystallize | Not crystallize out | Not crystallize out |
| Example 3 | Not crystallize | Not crystallize out | Not crystallize out |
| Example 4 | Not crystallize | Not crystallize out | Not crystallize out |
| Example 5 | Not crystallize | Not crystallize out | Not crystallize out |
| Example 6 | Not crystallize | Not crystallize out | Not crystallize out |
| Example 7 | Not crystallize | Not crystallize out | Not crystallize out |
| Example 8 | Not crystallize | Not crystallize out | Not crystallize out |
| Example 9 | Not crystallize | Not crystallize out | Not crystallize out |
| Example 10 | Not crystallize | Not crystallize out | Not crystallize out |

The data in Table 1 showed that the high-content abamectin emulsifiable concentrate of the present invention exhibited excellent stability in low-temperature stability experiments, and remained clear and transparent in an environment of minus 5 degrees without producing abamectin crystals; and the high-content abamectin emulsifiable concentrate of the present invention exhibited more excellent dilution stability in dilution stability experiments, and still did not crystallize out especially under the condition of high dilution factor (20000 times).

The invention claimed is:
1. An emulsifiable concentrate, comprising:
   (1) abamectin in an amount of 5 wt. %-20 wt. %, based on the total weight of the concentrate;
   (2) an amide selected from the group consisting of N,N-dimethyl capramide, N,N-dimethyl octanamide, and N,N-dimethyl dodecylamide in an amount of 20 wt. %-60 wt. %, based on the total weight of the concentrate; and
   (3) an optional surfactant.
2. The concentrate according to claim 1, further including an alkyl lactate of formula (II):

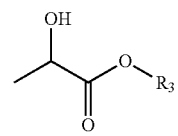

wherein $R_3$ is $C_1$-$C_{16}$ alkyl; and
wherein the alkyl lactate of formula (II) is present in an amount of 5 wt. %-55 wt. %, based on the total weight of the concentrate.
3. The concentrate according to claim 2, wherein $R_3$ in formula (II) is $C_1$-$C_8$ alkyl.
4. The concentrate according to claim 1, wherein the optional surfactant is present in an amount of 1 wt. %-30 wt. %, based on the total weight of the concentrate.
5. The concentrate according to claim 4, wherein the optional surfactant is present in an amount of 5 wt. %-20 wt. %, based on the total weight of the concentrate.
6. The concentrate according to claim 1, wherein the optional surfactant is present, and the optional surfactant is an anionic surfactant selected from the group consisting of: alkali metals, alkaline earth metals or ammonium salts of sulfonic acid, sulfuric acid, phosphoric acid, and carboxylic acid, and mixtures thereof.
7. The concentrate according to claim 1, wherein the optional surfactant is present, and the optional surfactant is a nonionic surfactant selected from the group consisting of:

alkoxylates, N-substituted fatty acid amides, amine oxides, esters, glycosyl surfactants, polymeric surfactants and mixtures thereof.

8. The concentrate according to claim 1, wherein the optional surfactant is present, and the optional surfactant is a cationic surfactant selected from the group consisting of: quaternary ammonium compounds having 1 or 2 hydrophobic groups, and salts of primary amines.

9. The concentrate according to claim 1, wherein the optional surfactant is present, and the optional surfactant is selected from the group consisting of: amphoteric surfactants, block polymers, and polyelectrolytes.

10. A method for preparing the concentrate according to claim 1 by mixing the abamectin, the amide, and the optional surfactant.

11. An emulsion obtained by mixing water with the concentrate according to claim 1.

12. An emulsifiable concentrate, comprising:
(1) abamectin in an amount of 5 wt. %-20 wt. %, based on the total weight of the concentrate;
(2) an alkyl lactate selected from the group consisting of: methyl lactate, ethyl lactate, and butyl lactate in an amount of 25 wt. %-40 wt. %, based on the total weight of the concentrate; and
(3) an optional surfactant.

13. The concentrate according to claim 1, wherein the abamectin is present in an amount of 10 wt. %-20 wt. %, based on the total weight of the concentrate.

14. The concentrate of claim 2, wherein the alkyl lactate of formula (II) is present in an amount of 10 wt. %-50 wt. %, based on the total weight of the concentrate.

15. The concentrate of claim 12, wherein the abamectin is present in an amount of 10 wt. %-20 wt. %, based on the total weight of the concentrate.

* * * * *